Sept. 24, 1968          N. A. WELCH          3,403,380

KEY CARD OPERATED SWITCH AND SYSTEM

Filed March 1, 1965          4 Sheets-Sheet 1

INVENTOR.
NICHOLAS A. WELCH
BY
McCormick, Paulding & Huber
ATTORNEYS

Sept. 24, 1968        N. A. WELCH        3,403,380
KEY CARD OPERATED SWITCH AND SYSTEM
Filed March 1, 1965        4 Sheets-Sheet 2
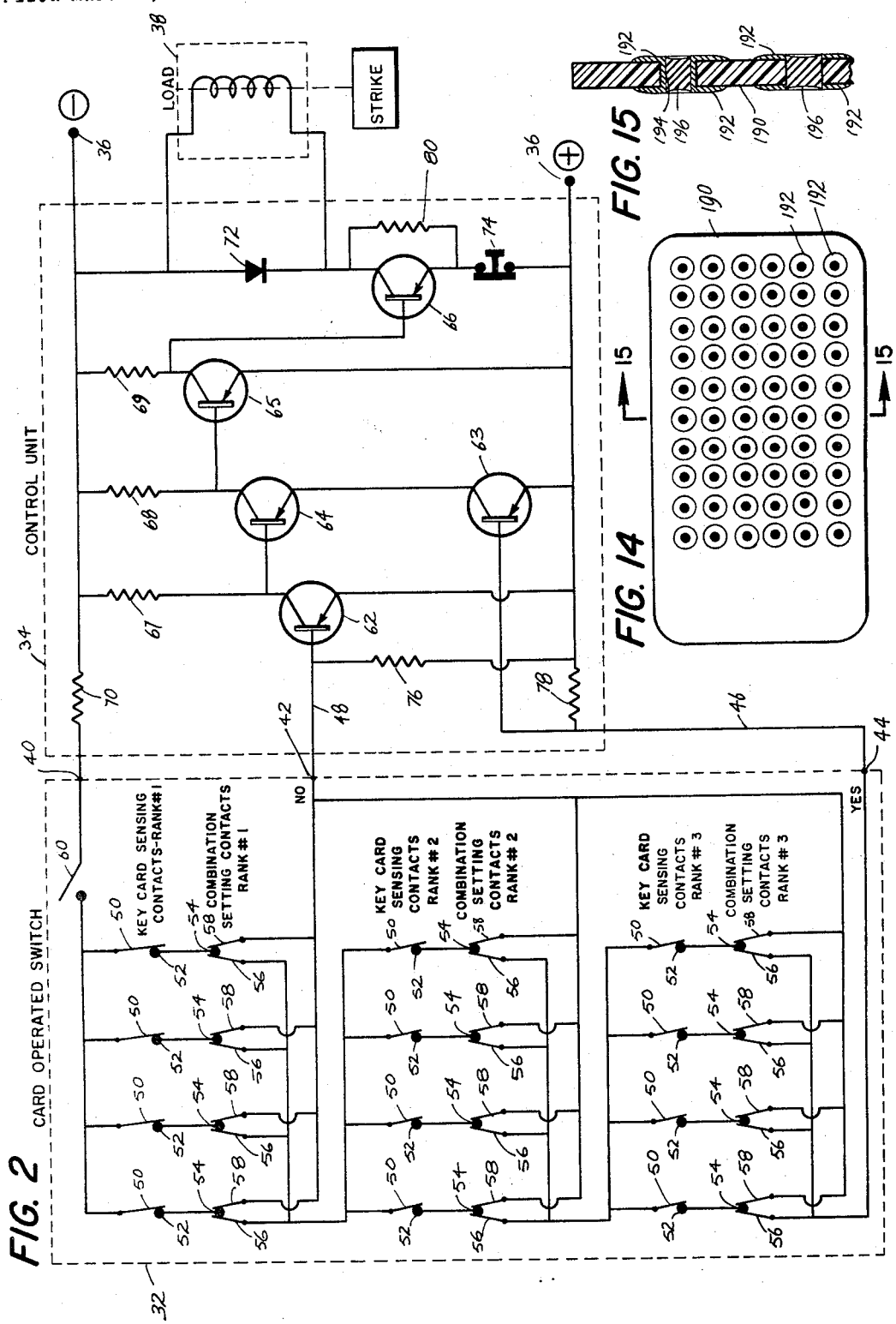

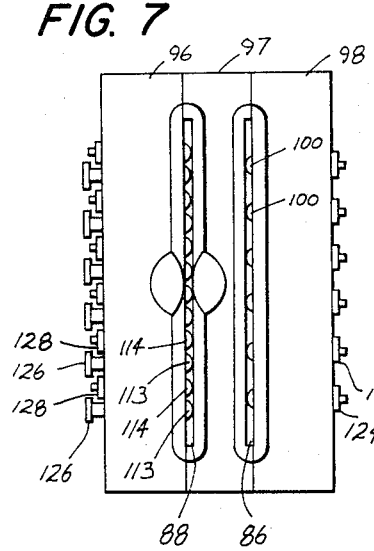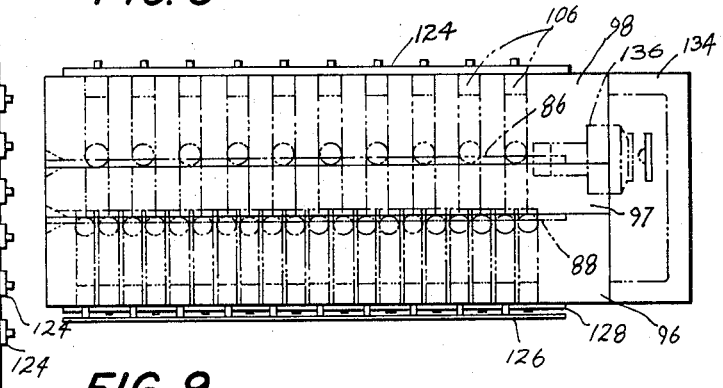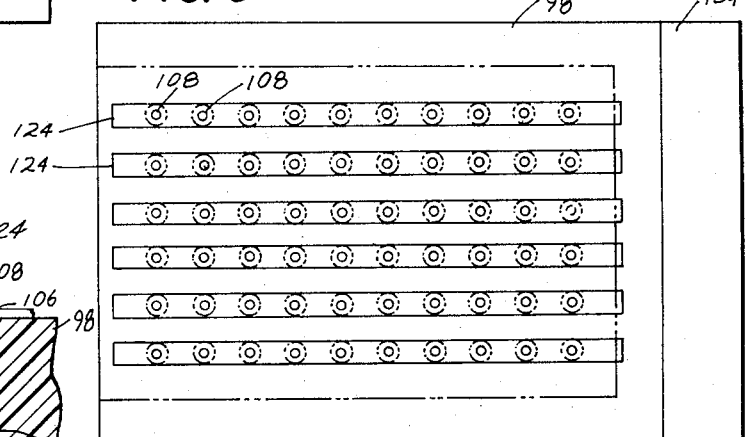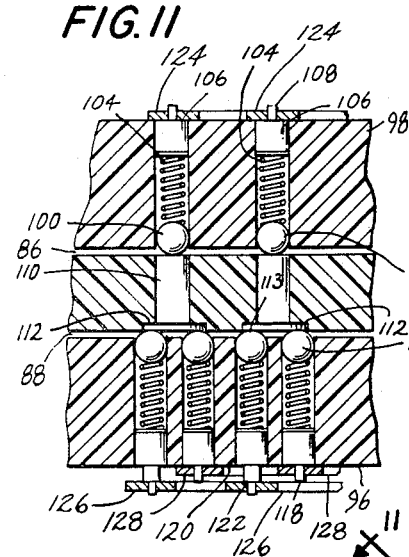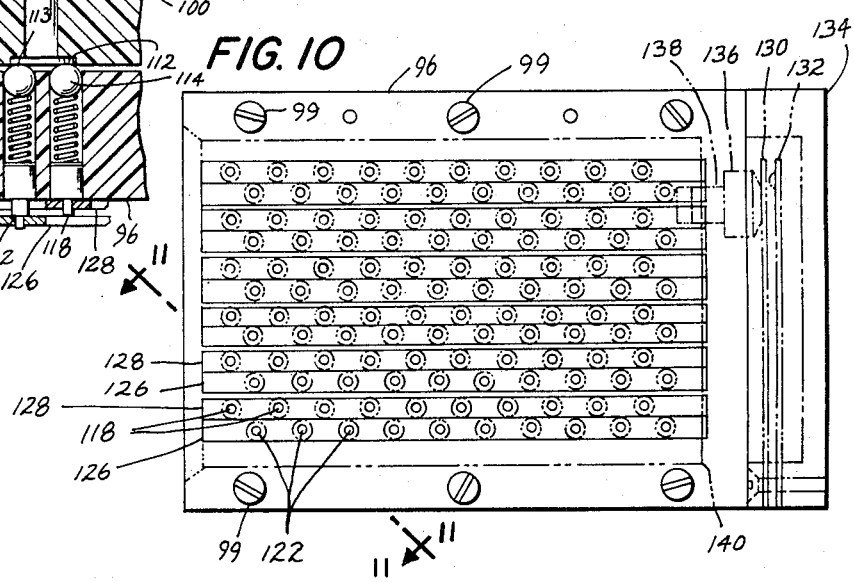

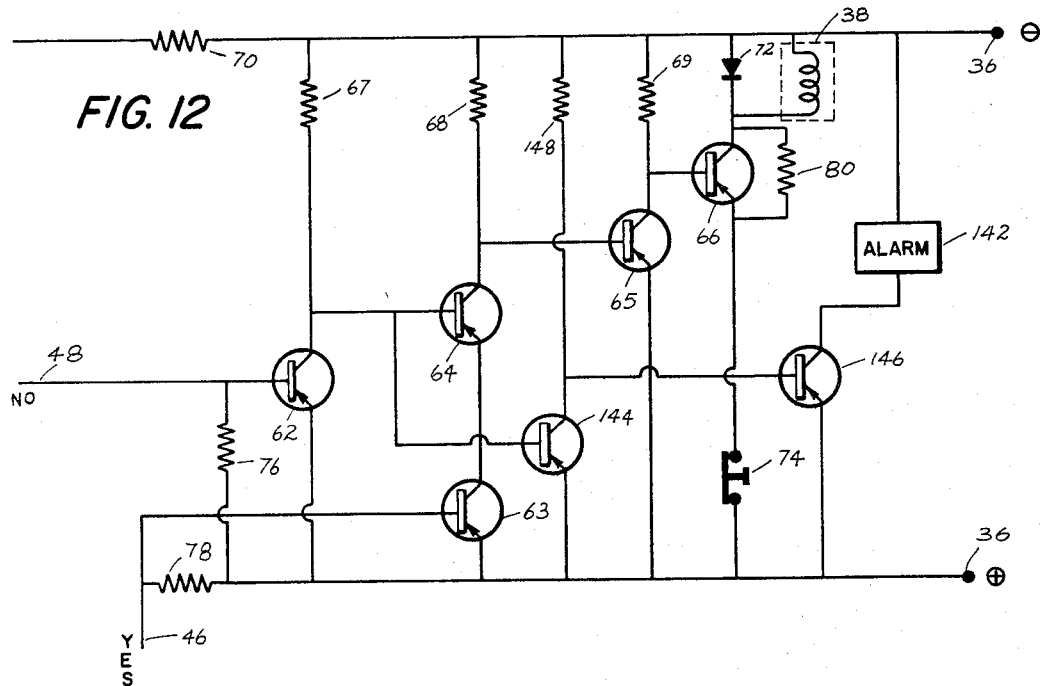
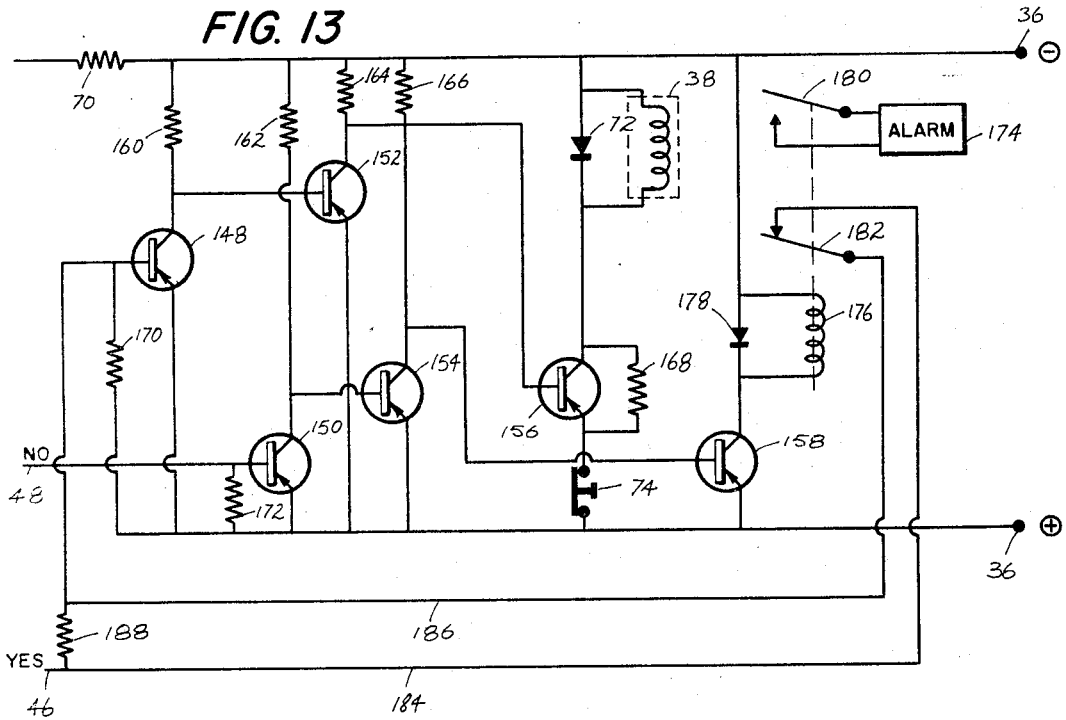

United States Patent Office 3,403,380
Patented Sept. 24, 1968

3,403,380
KEY CARD OPERATED SWITCH AND SYSTEM
Nicholas A. Welch, West Hartford, Conn., assignor to Embart Corporation, Bloomfield, Conn., a corporation of Connecticut
Filed Mar. 1, 1965, Ser. No. 437,009
11 Claims. (Cl. 340—149)

ABSTRACT OF THE DISCLOSURE

In a key card operated switch a combination setting card insertable therein conditions a plurality of sets of combination setting contacts to establish the acceptableness of a key card inserted therein. Each set of combination setting contacts includes one main contact, connected to an associated pair of key card sensing contacts, and two other contacts which are maintained alternately to one another in either a closed or an open condition relative to the main contact by the combination setting card. When an acceptable key card is inserted in the switch, a closed circuit is completed through closed pairs of key card sensing contacts and associated closed pairs of combination setting contacts. If an unacceptable key card in inserted in the switch, another closed circuit, indicating the unacceptableness, is completed through at least one closed pair of key card sensing contacts and one closed pair of combination setting contacts.

---

This invention relates to a key card operated electric switch and to a control system employing such a switch. More particularly, it deals with such a switch and system for use with a key card having indicator means distributed over the surface thereof, and operable to perform a desired function in response to the insertion in the switch of a key card having indicator means distributed thereover in a predetermined pattern.

The key card operated switch and system of this invention are particularly useful as part of a lock associated with a door of a hotel, private club, home or the like, and it is herein illustrated and described in such an environment. It will be understood, however, that this has been done by way of example only and that devices embodying the invention may be used in many other areas where keys or identity devices are required.

The key card used with the device of this invention is one having a number of punched holes or other indicator means distributed over the surface thereof, and the device is responsive or sensitive to a particular pattern or arrangement of such indicator means on a card. This pattern of indicator means on a key card corresponds generally to the "combination" of an ordinary key, as for example the key of a cylinder lock, and for this reason is sometimes hereinafter referred to as the combination of the key card. As used herein, the term "switch" refers to the device in which the key card is inserted and which operates to condition an associated electrical circuit in one way when receiving a key card having an acceptable combination and to condition such circuit in another way when receiving a key card having an unacceptable combination.

One object of this invention is to provide a key card operated switch and system having, or at least capable of having, an extremely large number of possible key card combinations so as to make it possible in a given installation to eliminate or reduce the possibility of one key card operating a switch or lock other than the one for which it is intended.

Another object of this invention is to provide a key card operated switch and system wherein the combination to which a particular switch is responsive may be readily and easily varied. In keeping with this object, a still further object is to provide a key card operated switch and system wherein the combination to which a particular switch is responsive is determined by means of a combination setting card, generally similar to the key card and sometimes hereinafter referred to as a "set card," which is received in the switch and which is readily replaced by another such set card to change the combination to which the switch is responsive.

A still further object of this invention is to provide a key card operated switch and system wherein each switch may be made responsive to two (or possibly more) key card combinations so that, if desired, in an installation having a large number of switches each switch may be made responsive to the same master combination and also to one individual combination, thereby permitting all switches to be operated by a single master key card in addition to its own individual key card.

Another object of this invention is to provide a key card operated system of the foregoing character wherein operation of the system is positively prevented in the event a key card having an indicator means falling outside of the predetermined pattern or combination is inserted in the switch.

A further object of this invention is to provide a key card operated system of the foregoing character which which is difficult or impossible to pick by means of probes or other devices inserted in the key card receiving slot.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a pair of this specification being relied upon for that purpose.

Of the drawings:

FIG. 2 is a wiring diagram of a card operated switch and associated control unit embodying the present invention, this figure showing the switch contacts in the states occupied when no key card or combination setting card is received therein.

FIG. 7 is an end view on an enlarged scale of the card operated switch of FIG. 4.

FIG. 8 is a side elevational view of the card operated switch of FIG. 4 drawn on the same scale as FIG. 7.

FIG. 9 is a top view of the switch as seen in FIG. 8.

FIG. 10 is a bottom view of the switch as seen in FIG. 8.

FIG. 11 is a still further enlarged scale sectional view taken on the line 11—11 of FIG. 10.

FIG. 12 is a wiring diagram showing an alternative control unit usable with the card operated switch of FIG. 2.

FIG. 13 is a wiring diagram of yet another alternative control unit usable with the card operated switch of FIG. 2.

FIG. 14 is a plan view of an alternative key card usable with the card operated switch of FIG. 4.

FIG. 15 is a partial sectional view drawn on an enlarged scale and taken along the line 15—15 of FIG. 14.

Figure 1:
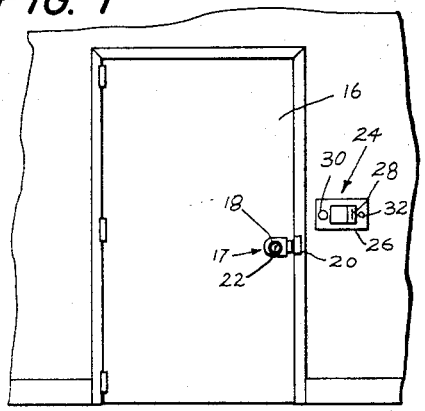
FIG. 1 is an elevational view of a door equipped with a lock utilizing the present invention.

Turning now to the drawings and first considering FIG. 1, this figure shows, by way of example, a card operated switch and system of the present invention used as part of a lock device for locking and unlocking a door 16. Included in the door is a conventional latch 17 having a knob 18 which may be turned by hand to withdraw a bolt from an associated strike 20. The knob 18 is, however, normally prevented from turning by an associated cylinder lock 22 which serves as a master lock for the door and is normally maintained in a locked condition.

The strike 20, which may be of conventional construction, is electrically operated and forms part of the key card operated system. Associated with this strike is a key card operated switch assembly 24 mounted in or on the wall adjacent the door 16 and including a cover 26. The cover 26 has a slot 28 for permitting a key card to be inserted into and removed from the switch, and when a proper key card is inserted into the slot, the electric strike 20 is operated to remove itself from locking relationship with the bolt of the latch 17. As explained in more detail hereinafter, the control circuit associated with the card operated switch is such that after an acceptable key card is inserted into and removed from the switch, the strike 20 remains operated until a reset button 30 is pushed. Also included in the switch assembly 24 of FIG. 1 is a small cylinder lock 32 for locking in place the cover of the assembly. When the lock 32 is unlocked, the cover 26 is removable from the remainder of the assembly to permit the insertion or replacement of a combination setting card for setting the combination to which the switch is sensitive.

Turning now to FIG. 2, this figure illustrates the general electrical features of the card operated switch and system of this invention. As shown in this figure, the system comprises basically a card operated switch indicated by the broken line box 32 and an associated control unit indicated by the broken line box 34. The control unit is adapted for connection with a suitable direct current power supply through the terminals 36, 36 and is also connected to a controlled device or load. In FIG. 2, such a controlled device is indicated by the broken line box 38 and is shown to consist of an electrically operated strike such as the strike 20 of FIG. 1. It will, of course, be understood that the nature of the load 38 may vary widely depending on the use to which the system is put and that the system is in no way limited to use only with electric strikes.

Considering the construction of the card operated switch 32, this switch comprises a large number of key card sensing contact pairs combined with another plurality of sets of combination setting contacts. The key card used with the switch is receivable in a slot in the switch and has its surface divided into a number of discrete areas or locations each of which areas becomes associated with a respective pair of key card sensing contacts when the card is inserted in the switch slot. Suitable indicator means are provided on the card at some of these discrete areas, and depending on the presence or absence of such an indicator means at such a discrete area of the card, the associated pair of card sensing contacts will be either opened or closed when the key card is fully inserted in the slot. The switch 32 includes an input terminal 40 and two output terminals 42 and 44 which are referred to respectively as a NO terminal and a YES terminal. By proper setting of the sets of combination setting contacts, suitable connections may be established so that when a key card having an acceptable pattern or combination of indicator means is inserted in the switch, at least some of the pairs of key card sensing contacts which are thereby closed are connected in series between the input terminal 40 and the YES terminal 44 to produce a signal at the terminal 44 which is transmitted to the control unit 34 over an associated YES line 46 connected to the terminal 44. Also, the interrelationship of the key card sensing contacts and the combination setting contacts is such that in the event the inserted key card includes an indicator means at an unacceptable location, that is at a location falling outside of the predetermined pattern or combination to which the switch is set, the closing of the pair of key card sensing contacts associated with such unacceptable location completes a circuit between the input terminal 40 and the NO terminal 42 to produce a signal which is transmitted to the control unit 34 over a NO line 48 connected with the terminal 42.

The actual construction and arrangement of the key card sensing contacts and the combination setting contacts in an actual switch may vary widely. Preferably, however, the key card sensing contacts comprise a large number of pairs of contacts which are divided and arranged into a number of ranks. In the FIG. 2 example, there are twelve such contact pairs arranged in three ranks of four pairs per rank, with each contact pair including a movable contact 50 and a stationary contact 52. The combination setting contacts in turn comprise a number of sets of contacts each of which sets is associated with a respective one of the pairs of key card sensing contacts. More particularly, each set of combination setting contacts includes a fixed contact 54 electrically connected to the contact 52 of the associated pair of key card sensing contacts and two movable contacts 56 and 58 which are normally closed relative to the associated contact 54. The sets of combination setting contacts are arranged in ranks similar to the rank arrangement of the key card sensing contacts.

In order to establish the desired interconnection between the key card sensing contacts and the combination setting contacts, the contacts 50, 50 of the first rank of key card sensing contacts are connected in common to the input terminal 40 through an on-off switch 60. This latter switch is normally open and is arranged so as to be contacted and closed by a key card when the key card reaches its fully inserted position. The contacts 56, 56 of the last or third rank of combination setting contacts are in turn connected in common to the YES terminal 44. The contacts 56, 56 of the first rank of combination setting contacts are connected in common with one another and in common with the contacts 50, 50 of the second rank of key card sensing contacts. Likewise, the contacts 56, 56 of the second rank of combination setting contacts are connected in common with each other and in common with the contacts 50, 50 of the key card sensing contacts of the third rank. Each contact 58 of the entire plurality of combination setting contact sets is suitably connected to the NO terminal 42.

The sets of combination setting contacts may be set in various different ways depending on the nature of their construction and could, for example, take the form of small toggle or lever operated switches set to one state or another by manual operation of their toggles or levers. Also, the combination setting contacts need not be located physically close to the key card sensing contacts and could be located at a considerable distance from the latter contacts, the electrical connections between the key card sensing contacts and the combination setting contacts in this case including a long bundle of wires. Using this principle, the key card sensing contacts could be located, for example, adjacent a room door of a hotel and the combination setting contacts could be located at the registration desk to permit the combination of the room door lock to be set by the registration clerk at the registration desk. In the presently preferred construction, however, the combination setting contacts are, as shown in the switch of FIGS. 4 and 7 to 11, located directly adjacent the associated key card sensing contacts and are adapted to be set or operated by a card generally similar to a key card.

In FIG. 2, the key card sensing contacts are shown in the states occupied when no key card is inserted in the switch. More particularly, each of the movable contacts 50, 50 is closed on its associated fixed contact 52. In addition, FIG. 2 also shows the combination setting contacts in their unset conditions wherein each of the movable contacts 56, 56 and 58, 58 is closed on its associated fixed contact 54.

Figure 3:
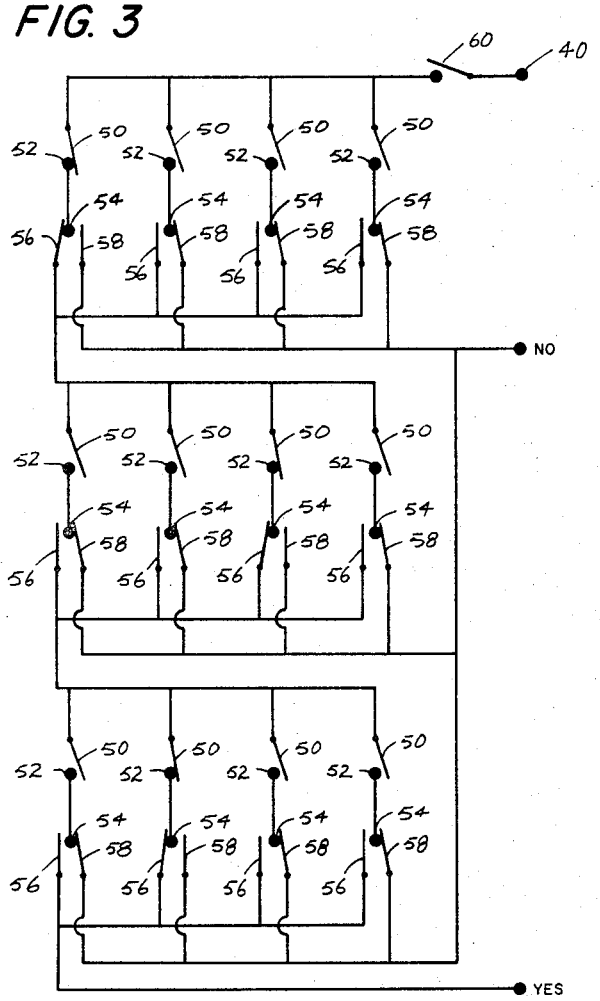
FIG. 3 is a wiring diagram of the card operated switch of FIG. 2 but shows the switch contacts in the states occupied when a key card and a combination setting card are received therein.

FIG. 3 shows the switch 32 with the contacts thereof in the states occupied when the combination setting contacts are set to a particular combination and when a key card corresponding to such combination is inserted therein. As to the setting of the combination setting contacts, it will be noted that when these contacts are set, only one of the movble contacts 56 and 58 of each set will engage the associated fixed contact 54. Where a set of combination setting contacts comprises part of the desired combination, the contact 56 of such set engages the associated contact 54. Where a set of combination setting contacts does not form a part of the desired combination, the contact 58 of such set engages the associated contact 54. For example, if in FIG. 3 the four contact sets of each rank are assigned the numbers 1–2–3 and 4 counting left to right, it will be noted that the combination setting contacts in this figure are set to the combination represented by the number 1–3–2. When a key card containing this combination (in the form of the arrangement of indicator means thereon) is inserted in the switch the pairs of key card sensing contacts are conditioned to close each contact pair associated with a combination setting contact set forming part of the selected combination, the other pairs of key cards sensing contacts being opened. That is, as shown in FIG. 3, the pairs of key card sensing contacts closed by the key card conform to the 1–3–2 combination set by the combination setting contacts. The insertion of the key card in the switch also closes the on-off switch 60, and from FIG. 3 it will be noted that as a result of the insertion of the proper key card a closed circuit is completed from the input terminal 40 to the YES terminal 44, the circuit passing through the switch 60, the No. 1 pair of card sensing contacts of the first rank, the closed contacts 54 and 56 of the No. 1 set of combination setting contacts of the first rank, the No. 3 pair of card sensing contacts of the second rank, the closed contacts 54 and 56 of the No. 3 set of combination setting contacts of the second rank, and the No. 2 pair of card sensing contacts of the third rank and the closed contacts 54 and 56 of the No. 2 set of combination setting contacts of the third rank. At the same time, the opened condition of all other pairs of key card sensing contacts maintains an open circuit between the input terminal 40 and the NO terminal 42.

Before leaving the wiring and electrical operation of the switch 32, its operation in the case of the insertion therein of a key card having an improper or unacceptable combination should be considered. Two types of unacceptable key cards may be envisioned. One is a card having three indicator means, one for each rank, arranged thereon to form the wrong combination. The second is a card having more than one indicator means for one or more of the ranks, and possibly having an indicator means at each of the twelve possible locations, so as to cover more than one combination. In the case of the first card, it will be obvious that the key card sensing contact pairs will not be closed in the proper pattern to produce a closed circuit between the input terminal 40 and the YES terminal 44, and as a result, no signal will appear at the YES terminal. At the same time, the closure of one or more pairs of key sensing contacts falling outside of the combination will complete a circuit from the input terminal 42 to the NO terminal 44 and will accordingly produce a signal at the NO terminal. For example, suppose the combination setting contacts are set as shown in FIG. 3 to the combination represented by the number 2–3–3. In this case, the closure of the second pair of key card sensing contacts of the No. 1 rank will complete a circuit from the input terminal 40 through such closed contacts and through the associated closed contacts 54 and 58 to the NO terminal 42. In the case of a key card having more than one indicator means for at least one of the ranks, the insertion of the card in the switch may or may not form a complete circuit from the input terminal 40 to the YES terminal 44 depending on whether the predetermined combination is included in the various possible combinations to be derived from the arrangement of the indicator means on the card. Nevertheless, the card will include at least one indicator means falling outside of the predetermined combination and, through the closure of the associated pair of key card sensing contacts, a closed circuit will be formed from the input terminal 40 to the NO terminal through the closed contacts 54 and 58 of the associated combination setting contact set. As explained in more detail hereinafter, the control unit 34 associated with the switch 32 is such as to produce an output energizing the load 38 only when a signal appears at the YES terminal 44 in the absence of a signal at the NO terminal 42. The appearance of a signal at the NO terminal 42 prevents operation of the system whether or not a signal appears at the YES terminal 44.

At this point, it should also be noted that by setting more than one set of combination setting contacts in a rank, the switch 32 may be made to be responsive to more than one key card combination. For example, in an installation having a number of switches such as the one shown in FIG. 3, the combination setting contacts of all of the switches may be set to a master combination, such as the combination represented by the number 4—4—4, as well as each switch being set additionally to its own individual combination. As a result, each switch will be capable of being operated by a master key card having the combination 4—4—4 and will also be operable by another card having another combination peculiar to the switch. In the switch shown by the wiring diagrams of FIGS. 2 and 3, the twelve pairs of card sensing contacts are arranged in three ranks of four pairs per rank, and this provides the switch with thirty-two different possible combinations to which it may be set. By providing additional ranks of card sensing contacts and/or more pairs of contacts per rank any desired number of possible combinations may be obtained. In the switch shown in FIGS. 7 to 11, for example, there are six ranks of such contacts with ten pairs of contacts per rank, making a total of one million possible combinations.

Turning now to the control unit 34 forming part of the system shown in FIG. 2, the control unit is designed to operate on very small currents passing through the switch 32 and, as mentioned previously, to produce an output only when a signal appears at the YES terminal of the switch in the absence of a signal at the NO terminal. The control unit is preferably transistorized, the illustrated unit including five PNP transistors 62, 63, 64, 65 and 66. The negative input terminal 36 of the control unit is connected to the collectors of the transistors 62, 64 and 65 through resistors 67, 68 and 69, respectively, and is also connected to the input terminal 40 of the card operated switch 32 through a current limiting resistor 70. The emitters of the transistors 62 and 65 are connected directly to the positive terminal 36 of the control unit, and the emitter of the transistor 64 is connected to the posiive terminal 36 through the emitter-collector circuit of the transistor 63. The transistor 66 is a power transistor and has its emitter-collector circuit connected across the positive and negative input terminal 36, 36 in series with the load 38 and a reset push button 74. The base of the transistor 62 is connected directly to the NO terminal 42 of the switch 32 by the NO line 48 and is also connected to the positive input terminal 36 through a biasing resistor 76. The base of the transistor 63 is connected directly to the YES terminal 44 through the YES line 46 and is also connected to the positive terminal 36 through a biasing resistor 78. The base of the transistor 64 is connected to the collector of the transistor 62, the base of the transistor 65 is connected to the collector of the transistor 64 and the base of the transistor 66 is connected to the collector of the transistor 65. The emitter and collector terminals of the power transistor 66 are shunted by a resistor 80 and the load is shunted by a diode 72, the diode being arranged as indicated to prevent the flow of current therethrough from the positive terminal 36 to the negative terminal 36, and as a result causing the current to normally flow through the load circuit. However, the load 38 is shown to comprise an electrically operated strike including a solenoid having a high inductance, and the diode 72 serves when the load circuit is opened to provide a circuit for dissipating the voltage induced across the solenoid. The resistor 80 is so chosen in relation to the load 38 that when the power transistor 66 is nonconducting the current flowing through the resistor will be sufficient to hold the strike in its actuated position but insufficient to move it from its unactuated to its actuated position. When the power transistor 66 does conduct it shunts out the resistor 80 and pulls in the strike. Thereafter, if the transistor 66 is returned to its nonconducting state, the current flowing through the resistor 80 will maintain the strike in its actuated or unlocked condition until the circuit is interrupted by pushing the push button 74.

Considering now the operation of the control unit 34, the two transistors 62 and 63 are biased so as to be normally nonconducting in the absence of signals appearing on the associated NO and YES lines 48 and 46. Since the base of the transistor 64 is connected to the collector of the normally nonconducting transistor 62, the base of the transistor 64 is normally maintained at the potential of the negative terminal 36 and is accordingly rendered conducting. This transistor, however, has its emitter-collector circuit connected in series with the emitter-collector circuit of the normally nonconducting transistor 63 and therefore no current normally flows through this transistor. The transistor 65 has its base connected to the collector of the transistor 64 and since no current normally flows through this collector circuit the base of the transistor 65 is normally maintained at the potential of the negative terminal 36 and is accordingly normally conducting. The power transistor 66 has its base connected to the collector of the transistor 65, and since this transistor is normally conducting the base of the power transistor is normally maintained at a potential close to the potential of the positive terminal 36 and sufficient to maintain the power transistor in a nonconducting condition.

From the foregoing, it will be understood that the power transistor 66 is normally nonconducting and that accordingly no actuating current normally flows through the load or strike 38. Now, assume that a signal appears on the YES terminal 44 in the absence of a signal at the NO terminal 42 as a result of the card operated switch 32 receiving a key card having the proper combination of indicator means thereon. Because of the signal on the YES terminal, the transistor 63 is now rendered conducting and since the transistor 64 is already in a conducting state, current will flow through the circuit including the resistor 68 and the emitter-collector circuit of the transistors 64 and 63 to raise the potential appearing at the base of the transistor 65 and to accordingly cut-off the latter transistor. This in turn lowers the potential appearing on base of the transistor 66 and renders the latter conducting. Current therefore will now flow through the reset switch 74, the emitter-collector circuit of the transistor 66 and through the load 38 to pull in the strike. If the key card is now removed from the switch 32 the transistors will be returned to their normal states but sufficient current will continue to flow through the resistor 80 to hold in the strike. When it is desired to release the strike, the reset button 74 may be pushed to break the circuit through the load momentarily to allow the strike to move to its normal locking condition. As mentioned above, the resistor 80 is so chosen that when the reset button is returned to its normal closed condition the current which does flow through the resistor 80 is insufficient to pull in or actuate the strike.

To consider further the operation of the control unit 34 of FIG. 2, consider now that a signal appears at the NO terminal 42 of the switch as a result of the insertion of a key card having an unacceptable combination of indicator means thereon. This signal is transmitted to the base of the transistor 62 and renders it conducting. As a result of the transistor 62 conducting, the base of the transistor 64 is raised to a potential close to the potential of the positive terminal 36 and cuts off the transistor 64. Accordingly, no current will flow through the resistor 63 regardless of whether or not the transistor 63 is made conducting by the appearance of a signal at the YES terminal 44. The transistors 65 and 66 are therefore maintained in their normal states and no operation of the load 38 is possible until the signal is removed from the NO terminal 42.

Figure 4:
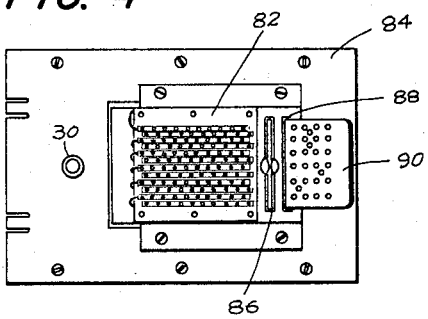
FIG. 4 is an enlarged elevational view of a card operated switch embodying the present invention, this switch being similar to the one shown in FIG. 1 and being shown with its cover removed.

Turning now to FIGS. 4 to 11, these figures illustrate in more detail the actual physical construction of a card operated switch such as employed in FIG. 1 and including the basic arrangement and interconnection of contacts shown in the switch 32 of FIGS. 2 and 3. Referring first to FIG. 4, the switch itself is shown at 82 and comprises a generally rectangular body which is attached to a flat support plate 84. The switch 82 is supported at an inclined condition relative to the plate 84 so as to have one end spaced from the surface of the plate 84 and facing generally outwardly, this end containing the mouth of one slot 86 for receiving a key card and the mouth of another slot 88 for receiving a combination setting card. In FIG. 4, the slot 86 is shown empty and the slot 88 is shown with a combination setting card 90 partially received therein. The cover 26 of the switch assembly, as shown in FIG. 1, is so designed that when in place with respect to the support plate 84, the slot 28 in the cover is aligned with the key card receiving slot 86 of the switch so that the key card may be inserted through the slot 28 and into the slot 86. At the same time, the cover closes the combination setting slot 88 to prevent the insertion or removal of a combination setting card while the cover is in place.

Figure 5:
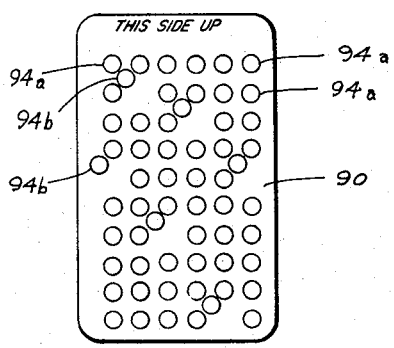
FIG. 5 is a plan view of a combination setting card for use with the card operated switch of FIG. 4.

The switch shown in FIG. 4 differs from that of FIGS. 2 and 3 by way of including a considerably larger number of pairs of key card sensing contacts and associated sets of combination setting contacts. More particularly, the switch of FIG. 4 includes sixty pairs of key card sensing contacts and sixty associated sets of combination setting contacts as compared to the twelve pairs and twelve sets of contacts of the switch 32 of FIGS. 2 and 3. The basic scheme of interconnection of the contacts in the switch of FIG. 4 is, however, identical to the scheme of interconnection illustrated by FIGS. 2 and 3. In the switch of FIG. 4 the sixty pairs of key card sensing contacts and the sixty sets of combination setting contacts are arranged in six racks of contacts with each rank containing ten pairs or sets of contacts. The switch of FIG. 4 is further adapted for use with key cards and combination setting cards having indicator means in the form of holes punched through the cards. FIG. 5, for example, shows a typical combination setting card 90 usable with the switch 82 and FIG. 6 shows a typical key card also usable with the switch 82.

Considering the combination setting card 90, this card includes one opening for each set of combination setting contacts in the switch, and depending on the location of each hole, the associated set of contacts will be set to either be included in the desired combination or to fall outside of the desired combination. The combination setting card 90 of FIG. 5 is punched so as to set the switch to respond to only one combination.

Referring to FIG. 5, it will be noted that the card 90 includes six ranks of openings with each rank including nine generally aligned openings indicated at 94a, 94a and one opening indicated at 94b located slightly out of alignment and to the left of the other nine openings. The nine generally aligned openings 94a, 94a of each rank act to set the associated combination setting contact sets to fall outside of the desired combination while the openings 94b, 94b set the associated combination setting contact set to be included in the combination. If the openings in each rank of the card 90 are assigned the numbers from nine to zero in going from the bottom to the top in FIG. 5, it can be seen that the card 90 is punched to set up a combination corresponding to the numbers 4–1–6–2–9–4.

Figure 6:
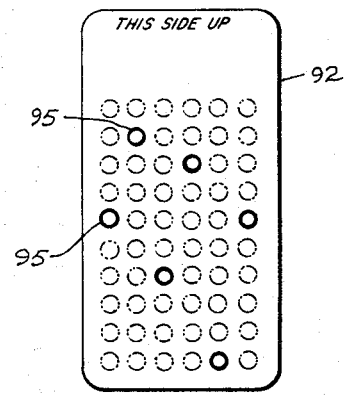
FIG. 6 is a plan view of a key card for use with the card operated switch of FIG. 4.

The key card 92 of FIG. 6 is punched to conform to the combination set up by the combination setting card 90 of FIG. 5. In this figure, the circles drawn in phantom indicate the various possible locations for openings in the card and the card includes one punched opening 95 in each rank of possible openings. The combination of the openings will further be noted to conform to the numbers 4–1–6–2–9–4, the opening 95 in the left-most rank being in the fourth position, the opening in the next rank being in the first position, the opening in the next rank being in the sixth position, the opening in the next rank being in the second position, the opening in the next rank being in the ninth position and the opening in the right-most rank being in the fourth position.

Referring now to FIGS. 7 to 11 for a more detailed description of the switch 82 of FIG. 4, this switch in the illustrated case is comprised of three blocks 96, 97 and 98 of plastic or other suitable electrical insulating material, held together by a number of screws 99, 99 as shown in FIG. 10, with the intermediate block 97 being recessed on both of its faces to define the key card receiving slot 86 and the combination setting card slot 88. The key card sensing contacts comprise a plurality of ball contacts 100, 100 received in openings formed in the block 98 perpendicular to the slot 86. Each ball is pressed or biased inwardly toward the slot 86 by a helical compression spring 104 located in the associated opening. At its inner end the spring 104 bears against the associated ball 100 and at its outer end engages a terminal 106 which is press fitted into the block 98 and which includes a reduced diameter stem 108 extending outwardly beyond the surface of the block 98. As shown best in FIGS. 8 and 9, the openings and the associated parts contained in the openings are arranged in ranks so that adjacent the slot 86 the contacts 100, 100, which correspond to the contacts 50, 50 of FIGS. 2 and 3, define six ranks of ten contacts per rank with the locations conforming to the locations indicated on the card 92 of FIG. 6.

The movable contacts 100, 100 cooperate with a corresponding plurality of contact members 110, 110 press fitted into the intermediate block 97 as shown best in FIG. 11. Each member 110 passes completely through the block 97 and at its upper end has a surface flush with the surface of the block 97. This surface is normally engaged by the associated ball contact 100 and corresponds to one of the contacts 52 shown in FIGS. 2 and 3.

The combination setting sets of contacts are located adjacent the slot 88 and also include the contact members 110, 110. Referring again to FIG. 11 it will be noted that at its lower end each member 110 has an enlarged head 112 defining an enlarged downwardly facing contact surface flush with the lower surface of the block 97. This surface is in turn normally contacted by two ball contacts 113 and 114 received in openings formed in the block 96 perpendicular to the slot 88. The two balls 113 and 114 are both pressed or biased toward the contact member 110 by associated helical compression springs similar to the springs 104, 104 used with the contacts 100, 100. The spring for the ball contact 114 at its upper end engages the ball and at its lower end engages a terminal member 116 similar to the terminal members 106, 106 press fitted in the block 96 and having a reduced diameter stem 118 projecting outwardly beyond the lower surface of the block. The spring associated with each ball contact 113 also at its upper end engages the ball and at its lower end engages a terminal 120 press fitted into the associated opening and slightly different from the terminals 116, 116 the terminal 120 having a stepped or two diameter stem 122 projecting outwardly beyond the lower surface of the block 96. From the foregoing, it should be noted that each set of combination setting contacts is made up of the two balls 113 and 114 and the downwardly facing surface of the enlarged head 112 of the associated contact member 110. In comparing this with FIGS. 2 and 3, it should be noted that the contact formed by the head 112 corresponds to a contact 54, the contact 113 corresponds to a contact 58 and the contact 114 corresponds to a contact 56.

Also, in comparing the arrangement of the contacts forming the sets of combination setting contacts, as may best be seen in FIG. 10, with the arangement of the openings in the combination setting card 90 of FIG. 5, it will be noted that the arrangement of the openings in the card is such that when the card is inserted in the slot 88, one or the other of the balls 113 or 114 of each set will pass through an opening in the card to contact the head 112 while the other ball is maintained out of contact by the interposition of the card material between the contact 112 and the ball. More particularly, the openings 94a, 94a of the card 90 are so located that when the card is inserted in the slot 88 the sets of contacts associated with these openings will have their contacts 113, 113 passing through the openings to contact the associated head 112 while the other contact 114, will be maintained out of contact with the head. On the other hand, the openings 94b, 94b in the card 90 are so located that the associated contact sets will have their contacts 114 passing through the openings and contacting the head 112 while the associated contacts 113 are held out of engagement with the head 112 by the card. In comparing the arrangement of the card sensing contacts with the key card 92 of FIG. 5 it will also be noticed that when the card is inserted in the switch the locations indicated in phantom on the card will be aligned with the ball contacts 100, 100. If an opening 95 occurs at any of these locations the associated ball will pass through the opening to engage the associated contact member 110. If no opening occurs at a particular location, the associated ball contact is held by the card out of engagement with the associated contact member 110.

The springs associated with the ball contacts also serve as electrical conductors for providing a circuit between each ball and its associated terminal 106, 116 or 120. The terminals 106, 106 of the various ranks of card sensing contacts are electrically connected in common by bus bars 124, 124 which extend longitudinally along the outer surface of the block 98 and which include openings for receiving the outwardly extending stems 108, 108 of the terminals, the stems 108, 108 being preferably soldered to the bus bars. Similarly, the ranks of terminals 116, 116 and 120, 120 of the combination setting contacts are also connected in common by bus bars 126, 126 and 128, 128 extending longitudinally of the block 96 as shown in FIGS. 7 and 10. The bus bars 126, 126 are associated with the terminals 120, 120 and are provided with openings for receiving the stems 122, 122 of these terminals, the openings being of such a diameter as to receive the smaller diameter portion of the stem and the bus bars being seated against the shoulders of the stems so as to be spaced some distance from the adjacent surface of the block 96. The bus bars 128, 128 are associated with the terminals 116, 116 and receive the stems 118, 118 of these terminals. These latter bus bars lie flat against the surface of the block 96 and are therefore spaced and electrically insulated from the bus bars 126, 126. Suitable connections are also made with the bus bars for connecting them in proper relationship to one another and to the associated control units in accordance with the scheme shown in FIGS. 2 and 3.

Also included in the switch of FIGS. 4 and 7 to 11, is an on-off switch corresponding to the on-off switch 60 of FIG. 2. This switch is located at the inner end of the switch and comprises two leaves 130 and 132 located in a chamber formed in an end cap 134 fastened to the blocks 96, 97 and 98. Associated with the leaf 130 is a plunger 136 having a stem 138 which is slidably received in a conforming opening formed in the blocks 97 and 98 adjacent the rear end 140 of the key card receiving slot 86. As viewed in FIG. 10, the plunger 136 is normally biased toward the left by the resiliency of the leaf 130 and the stem 138 is of such a length as to normally project a slight distance beyond the end 140 of the slot 86. When a key card is inserted into the slot, however, the stem 138 is engaged by the card to move the plunger 136 to the right and to close the two leaves 130 and 132.

FIGS. 12 and 13 show alternative control units which may be used with the card sensing switch of this invention, if desired, to provide additional safeguards against the use of unacceptable key cards in the switch or attempts to pick the switch by means of a probe inserted into the key card receiving slot. FIG. 12 illustrates a control unit having an alarm which is actuated whenever a key card having an unacceptable combination is inserted in the associated switch. FIG. 13 illustrates a control unit having both an alarm and means preventing the detection of active and inactive pairs of cards sensing contacts by means of a probe, an active pair of contacts being a pair included in the combination and an inactive pair being a pair falling outside of the combination.

Considering first FIG. 12, the control unit illustrated by this figure is generally similar to the control unit 32 of FIG. 2 and similar parts of the two units have been identified by the same reference numbers and will not be redescribed. The control unit of FIG. 12, however, additionally includes an alarm circuit comprising a suitable alarm device 142 and two transistors 144 and 146 for controlling its actuation. The transistor 144 has its base connected in common with the base of the transistor 64, its emitter connected directly to the positive terminal 36 and its collector is connected with the negative terminal 36 through a resistor 148. The transistor 146 is a power transistor and has its base connected to the collector of the transistor 144. The emitter-collector circuit of the transistor 146 is connected across the two power supply terminals 36, 36 in series with the alarm device 142. When a NO signal appears on the NO line 48 of the FIG. 12 control unit, as a result of the insertion in the associated switch of an unacceptable key card, the transistor 62, as explained previously, is driven to a conducting state. This in turn raises the potential on the base of the transistor 144 to drive it from its normally conducting to a nonconducting state. As the transistor 144 is turned off, the potential appearing on the base of the transistor 146 is reduced to switch it from a normally nonconducting state to a conducting state, permitting current to flow through its emitter-collector circuit and through the alarm device 142 to provide a visual or audible alarm indicating the use of an improper key card in the switch. It will, of course, be understood that the alarm device 142 may be located quite some distance from the switch as for example at the registration desk of a hotel using key card operated switches of this invention on its room doors.

Before considering the control unit of FIG. 13, it should be noted from FIG. 3 that in a card operated switch of this invention if the combination setting card is inserted into the switch to set the combination, and then the on-off switch closed without a key card being inserted in the switch, all of the card sensing contacts will be closed and the active pairs of card sensing contacts will carry a different current than the inactive pairs, since a number of inactive pairs of contacts will be in parallel with one another. Therefore, it is conceivable that the switch could be picked or read by inserting some sort of a probe into the switch to close the switch 60 and to measure the current flowing through each pair of card sensing contacts. The circuit shown in FIG. 13 is designed to prevent this possibility and to also provide for an alarm in the event picking takes place or in the event an improper key card is inserted into the switch.

Referring to FIG. 13, the illustrated circuit is slightly different from the circuit of the control unit 34 and includes six transistors 148, 150, 152, 154, 156 and 158, with each transistor being connected in a circuit extending across the two power supply terminals 36, 36. The transistors 148, 150, 152 and 154 are control transistors and respectively include resistors 160, 162, 164 and 165 connected between their collectors and the negative terminal 36. The emitters of these transistors are connected directly to the positive terminal 36. The transistor 156 is a power transistor for the load 38 and is shunted by a resistor 168 similar to the resistor 80 of FIG. 2. The load 38 is shunted by a diode 72 and the load circuit includes a reset push button 74 as in FIG. 2. Connected between the negative input terminal 36 and the line adapted for connection to the input terminal 40 of the switch is a current limiting resistor 70. Two transistors 148 and 150 are normally biased to a nonconducting state by associated biasing resistors 170 and 172 respectively. The base of the transistor 152 is connected to the collector of the transistor 148 and is normally conducting. Similarly, the base of the transistor 154 is connected to the collector of the transistor 150 and is normally conducting. The transistor 152 controls the power transistor 156 and has its collector connected to the base of the latter transistor. The transistor 154 controls the power transistor 158 and has its collector connected to the base of said latter transistor. The alarm is shown at 174 and is controlled by a relay having its coil 176 connected in series with the emitter-collector circuit of the power transistor 158 between the two input terminals 36, 36. A diode 178 is connected across the coil 176 as shown to dissipate the back-voltage induced across the coil when the circuit thereto is opened. Included in the relay are a pair of normally open contacts 180 which control the energization of the alarm 174 and a pair of normally closed contacts 182. One of the contacts forming the pair 182 is connected by a line 184 to the YES line 46 and the other is connected by a line 186 to the base of the transistor 148. The pair of contacts 182 is also shunted by a suitable resistor 188.

Considering now the operation of the control unit as shown in FIG. 13, it will be noted that when no key card is inserted in the switch, the transistors will be all in the normal states described whereat both of the power transistors 156 and 158 are nonconducting to maintain both the load 38 and the alarm 174 in their unactuated conditions. Assume now that a proper key card is inserted into the associated switch to produce a signal on the YES line 46. This signal is transferred through the closed contacts 182 to the base of the transistor 148 and switches the latter transistor from its nonconducting to a conducting state. This changes the bias on the base of the associated resistor 152 to switch the latter transistor from its conducting to its nonconducting state, and this in turn changes the voltage on the base of the power transistor 156 to render the same conducting to pass current to the load 38. Assuming that the load is a strike as shown in FIG. 2, the strike will be actuated and will remain actuated as a result of the current flowing through the resistor 168 even after the key card is removed from the switch and the YES signal removed from the line 46. Pushing the push button 74 will then interrupt the circuit to the load to reset the strike to its normal locking condition. It will be further noted that this operation has no effect on the alarm circuit and that the alarm 164 will remain in its unactuated condition.

Assume now that an improper key card is inserted into the switch associated with the control circuit of the FIG.

13 so as to produce a signal appearing on the NO line 48. This signal changes the voltage appearing on the base of the transistor 150 and switches the latter from its nonconducting to a conducting state. This in turn changes the voltage appearing on the base of the transistor 154 and switches the latter transistor from its conducting to its nonconducting state to in turn switch on the associated power transistor 158 in the alarm circuit. Current flowing through the emitter-collector circuit of the power transistor 158 energizes the relay coil 176 and accordingly closes the contacts 180 and opens the contacts 182. Closing of the contacts 180 energizes the alarm 174 and produces an appropriate visual or audible alarm.

Assume now that an attempt is made to pick or read the associated switch by somehow closing the associated on-off switch 60 and by inserting its probe into the key card receiving slot to individually measure the current flowing through each pair of key card sensing contacts. First of all, as soon as the switch 60 is closed the alarm 174 will be actuated as described above due to a NO signal appearing on the NO line 48, this signal in turn developing from the fact that a large number of improper pairs of key card sensing contacts will be closed. Also, as described above, when the alarm is sounded, the operation of the relay also opens the pair of contacts 182. This in turn opens the circuit which normally shunts the resistor 188 and causes any current flowing through the YES line 46 to flow through the resistor 188, the current in the YES line is therefore considerably reduced and by properly choosing the value of the resistor 188, the current flowing through any active pair of card sensing contacts can be made to be approximately equal to the current flowing through each inactive pair of card sensing contacts so that the probe will be unable to detect any difference in the current flowing in active and inactive contacts.

The key card 92 shown in FIG. 6 contains readily visible indicator means in the form of the openings 95, 95 and therefore may be readily duplicated. Where it is desired that such easy duplication be avoided different forms of key cards may be used. One such card is shown in FIGS. 14 and 15 and consists of a card 190 of insulating material having indicator means formed thereon by a suitable printed circuit process. The card 190 includes what appears to be an indicator means at each of the sixty possible indicator locations. However, most of the apparent indicator means are false or dummy devices. In the cross section shown in FIG. 15, the indicator means shown on the left is a dummy and the indicator means on the right is an active means. Considering first the right hand or active means of FIG. 15, this consists of two annular spots 192, 192, of copper or other conducting material located on opposite sides of the card 190 with the card having an opening passing therethrough at the location of the spots. The two spots are further electrically connected to one another by an annular layer 194 of the spot material which lines the opening in the card and which extends from one spot to another. The opening of this layer is in turn filled with a quantity 196 of paint, resin or other suitable material so as to render the layer 194 invisible from the outer surface of the card. The dummy indicator means shown at the left in FIG. 15 also includes two spots 192, 192 of copper or other similar conducting material, and a hole is also provided in the card at the location of the spots. This hole is, however, not provided with a lining of conducting material and therefore the two spots 192, 192 are electrically unconnected. The left hand opening is also filled with a quantity 196 of the same material as used to fill the right hand opening so that the absence of a conducting lining in the opening will not be visible from the outer surface of the card. Therefore, both the dummy indicator means and the active indicator means appear the same from the outside of the card and it is impossible from looking at the card to determine its combination. In using the card 190, it will be understood that when its is inserted into a switch, such as the switch 82, the desired closed circuits for the card sensing contacts will be made through the active indicator means. That is, the associated spring biased ball contact 100 will be pressed against the adjacent spot 192 and by the same bias force the spot 192 on the other side of the card will be pressed against the contact member 110. The two spots and the conducting layer in the associated card opening accordingly provides a conducting path through the card to provide a closed circuit across the ball contact 100 and the contact member 110.

The invention claimed is:

1. An electric card operated switch for use with a key card and with a combination setting card each having a plurality of indicator means distributed over its surface in a predetermined manner, said switch comprising means defining a slot into which a key card such as aforesaid may be inserted and another slot into which a combination setting card such as aforesaid may be inserted, a plurality of key card sensing pairs of contacts arranged in a plurality of ranks adjacent said key card slot, each of said pairs of contacts including a first contact and a second contact which are either closed or open relative to each other depending on the appearance or nonappearance of an indicator means thereat, means electrically connecting the first contacts of each of said ranks to each other, a plurality of sets of combination setting contacts arranged in a plurality of ranks adjacent said combination setting card slot and each of which sets is associated with a respective one of said key card sensing pairs of contacts, each of said sets of contacts including a third contact electrically connected to said second contact and also including fourth and fifth contacts which are either closed or open relative to said third contact depending on the appearance or nonappearance of an indicator means thereat, first and second and third terminals, means electrically connecting all of said fourth contacts to said first terminal, means electrically connecting the fifth contacts of each of said ranks to each other, means connecting the first rank of first contacts to said second terminal, means connecting each other rank of first contacts to the proceeding rank of fifth contacts, and means connecting the last rank of fifth contacts to said third terminal.

2. An electric card operated switch for the with a key card having a plurality of indicator means distributed over the surface thereof in a predetermined manner and each occupying a small discrete area of said card, said switch comprising means defining a first slot into which a key card such as aforesaid may be inserted, a plurality of contact means located adjacent said slot and arranged so that each such contact means is exclusively associated with a given discrete area of a card received in said slot, each of said contact means including a pair of contacts and being operable to close an electrical circuit across said pair of contacts when an indicator means of an inserted card appears at said pair of contacts and for maintaining an open electrical circuit thereacross when another part of such a card appears at said pair of contacts, said pairs of contacts collectively defining a plurality of first contact pairs, a plurality of second contact pairs each of which second pairs is associated with a respective one of said first contact pairs, means electrically connecting one contact of each of said first contact pairs to one contact of the associated second contact pair to form a plurality of sets of contacts each made up of one of said first pairs of contacts and one of said second pairs of contacts connected in series with each other, means for selectively setting said second pairs of contacts to open some of said second pairs and to close others of said second pairs, two control lines, means connecting at least some of said contact sets having closed second contact pairs in series with each other between said two control lines so that a closed circuit is established across said two control lines when a card inserted in said slot has indicator means arranged thereon in such a manner as to close the first pairs of contacts included in those contact sets connected in series between said two control lines, said means for selectively setting said second pairs of contacts including a set card having a plurality of indicator means distributed over the surface thereof in a predetermined manner and each occupying a small discrete area of said card, means defining a second slot into which a set card such as aforesaid may be inserted, said second pairs of contacts being located adjacent said second slot so that each pair is associated with a given discrete area of a set card received in said second slot and being operable to close an electrical circuit therebetween when an indicator means of an inserted card appears at said pair of contacts and to maintain an open electrical circuit thereacross when another part of such a set card appears at said pair of contacts, said first and second slots being parallel to each other and generally similar in size and shape, said first plurality of pairs of contacts being arranged relative to said first slot substantially similarly to the arrangement of said second plurality of pairs of contacts relative to said second slot so that each pair of contacts is aligned with the other pair making up the set of which it is a part, a piece of electrical insulating material separating said first slot from said second slot, and an insert of electrical conducting material fixed to and passing through said piece of electrical insulating material at the location of each of said sets of contacts, said insert at one end defining one of the contacts of the associated first pair of contacts and at its other end defining one of the contacts of the associated second pair of contacts.

3. An electric card operated switch for use with a key card having a plurality of indicator means distributed over the surface thereof in a predetermined manner and each occupying a small discrete area of said card, said switch comprising means defining a first slot into which a key card such as aforesaid may be inserted, a plurality of contact means located adjacent said slot and arranged so that each such contact means is exclusively associated with a given discrete area of a card received in said slot, each of said contact means including a pair of contacts and being operable to close an electrical circuit across said pair of contacts when an indicator means of an inserted card appears at said pair of contacts and for maintaining an open electrical circuit thereacross when another part of such a card appears at said pair of contacts, said pairs of contacts collectively defining a plurality of first contact pairs, a plurality of second contact pairs each of which second pairs is associated with a respective one of said first contact pairs, means electrically connecting one contact of each of said first contact pairs to one contact of the associated second contact pair to form a plurality of sets of contacts each made up of one of said first pairs of contacts and one of said second pairs of contacts connected in series with each other, means for selectively setting said second pairs of contacts to open some of said second pairs and to close others of said second pairs, two control lines, means connecting at least some of said contact sets having closed second contact pairs in series with each other between said two control lines so that a closed circuit is established across said two control lines when a card inserted in said slot has indicator means arranged thereon in such a manner as to close the first pair of contacts included in those contact sets connected in series between said two control lines, a third control line, and a third contact associated with each of said second pairs of contacts and connected to said third control line, said means for selectively setting said second pairs of contacts being also cooperable with said third contacts to provide a closed circuit between each such third contact and said one contact of the associated first pair of contacts when the associated second pair of contacts is open and to provide an open circuit between each such third contact and said one contact of the associated first pair of contacts when the associated second pair of contacts is closed.

4. An electric card operated switch for use with a key card and with a combination setting card receivable therein and each have a plurality of indicator means distributed over its surface in a predetermined manner, said switch comprising a plurality of key card sensing pairs of contacts for cooperation with a key card received in said switch and each of which pairs of contacts includes a first contact and a second contact which are either closed or open relative to each other depending on the appearance or non-appearance of a key card indicator means thereat when a key card is received in said switch, a plurality of sets of combination setting contacts for cooperation with a combination setting card received in said switch and each of which sets is exclusively associated with a respective one of said key card sensing pairs of contacts, each of said sets of combination setting contacts including a third contact electrically connected to the second contact of its associated pair of key card sensing contacts and also including fourth and fifth contacts each of which is either closed or open relative to said third contact depending on the appearance or non-appearance of a combination setting card indicator means thereat when a combination setting card is received in said switch.

5. An electric card operated switch as defined in claim 4 further characterized by a switch body, said third contact of each of said sets of combination setting contacts being fixed relative to said switch body and arranged so as to be located on one side of a combination setting card received in said switch, said fourth and fifth contacts of each of said sets of combination setting contacts being arranged so as to be located on the other side of a combination setting card received in said switch and being supported for movement relative to said switch body toward and away from their associated third contact, and means for biasing each of said fourth and fifth contacts toward its associated third contact.

6. In an electric key card operated switch for use with both a key card and a combination setting card receivable therein and each having a plurality of indicator means distributed over its surface in a predetermined manner, the combination comprising a plurality of sets of combination setting contacts for cooperation with a combination setting card and each of which sets includes a first contact and a second contact which are closed when an indicator means of a combination setting card received in said switch appear thereat and which are open when an indicator means of said combination setting card are absent therefrom, and means controlled by the receipt in said switch of a key card having a proper arrangement of indicator means thereon for completing an electrical circuit passing in series through at least some of such pairs of contacts which are closed by the indicator means of said combination setting card, each of said sets of combination setting contacts further including a third contact which is either maintained in an open or a closed condition relative to its associated first contact depending on the appearance or non-appearance of an indicator means of said combination setting card thereat.

7. An electrical switch for controlling the energization of an associated electrically powered device and operable by key cards insertable therein to condition such associated device in one way when receiving an acceptable key card and in another way when receiving an unacceptable key card, said key cards each including a plurality of information points at each of which an indicator means may appear, said switch comprising a switch body, means including a combination setting card inserted in said switch body for rendering acceptable thereto such key cards as have indicator means at at least some of their information points included in a selected group of such points and arranged in any one of several acceptable patterns made up of information points selected from said group, a main input terminal, a YES terminal, a NO terminal, means for establishing a closed circuit between said input terminal and said YES terminal and an open circuit between said input terminal and said NO terminal when an acceptable key card is inserted in said switch and to establish a closed circuit between said input terminal and said NO terminal when said switch has inserted therein a key card having indicator means thereon forming an acceptable pattern and also having one or more additional indicator means thereon located at one or more information points not included in said selected group.

8. An electrical switch according to claim 7 further characterized by a plurality of individual conductor elements divided into a number of consecutive groups, a group input terminal and a group output terminal associated with each of said groups, means for connecting the output terminal of each group of conductor elements to the input terminal of the following group, means controlled by the combination setting card inserted in said switch for connecting each of said conductor elements to either its associated output terminal or to said NO terminal, and means controlled by the key card inserted in said device for either electrically connecting each conductor element to its associated group input terminal or for maintaining an open electrical circuit between said conductor element and its associated group input terminal.

9. An electrical switch as defined in claim 8 for use with a combination setting card including a plurality of information points each corresponding to a respective one of said conductor elements and at each of which an information bearing means may appear, and further characterized by means associated with each of said conductor elements for connecting such element to its group input terminal if an information bearing means is present at its corresponding information point on a combination setting card inserted in said switch and for connecting such element to said NO terminal if no information bearing means is present at its corresponding information point on a combination setting card inserted therein.

10. In an electric card operated switch for use with a key card and a combination setting card each having a plurality of indicator means distributed over the surface thereof in a predetermined manner and each of which indicator means occupies a small discrete area of its card, the combination comprising means defining first and second slots into which cards such as aforesaid may be inserted, a plurality of contact means located adjacent said first slot and arranged so that each of said contact means is exclusively associated with a given discrete area of a card received in said slot, each of said first contact means including a first pair of contacts and being operable to close an electrical circuit across said pair of contacts when an indicator means of an inserted card appears at said pair of contacts and to maintain an open electrical circuit thereacross when another part of such a card appears at said pair of contacts, a plurality of second contact means located adjacent said second slot and arranged so that each of said latter contact means is exclusively associated with a given discrete area of a card received in such second slot, each of said contact means including a second pair of contacts and being operable to close an electrical circuit across said second pair of contacts when an indicator means of an inserted card appears at said second pair of contacts and for maintaining an open electrical circuit thereacross when another part of such a card appears thereat, each of said first pairs of contacts being exclusively associated with a respective one of said second pairs of contacts, a piece of electrical insulating material separating said first slot from said second slot, and a plurality of inserts of electrical conducting material fixed to and passing through said piece of electrical insulating material, each of said inserts at one end defining one of the contacts of one of said first pairs of contacts and at its other end defining one of the contacts of the associated second pair of contacts.

11. An electric card operated switch as defined in claim 10 further characterized by the other contacts of said first pairs of contacts including a plurality of movable contact elements located on the opposite side of said first slot from said fixed inserts, means for biasing each of said movable contacts toward its associated fixed insert, the other contacts of said second pairs of contacts including a plurality of movable contacts located on the opposite side of said second slot from said fixed inserts, and means for biasing each of said latter other movable elements toward its associated fixed insert.

References Cited

UNITED STATES PATENTS 3,100,389 8/1963 Noregaard.
3,182,144 5/1965 Shoe.
3,320,490 5/1967 Beck et al.

JOHN W. CALDWELL, *Primary Examiner.*

DONALD J. YUSKO, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,380                                                  September 24, 1968

Nicholas A. Welch

It is certified that error appears in the above identified patent and that said Letters Patent are hereby corrected as shown below:

Column 1, line 24, "in", first occurrence, should read -- is --. Column 2, line 27, cancel "which"; line 38, "pair" should read -- part --. Column 5, line 15, "movble" should read -- movable --; line 73, "2-3-3" should read -- 1-3-2 --. Column 14, line 43, "the" should read -- use --.

Signed and sealed this 24th day of February 1970.

(SEAL)
Attest:

Edward M. Fletcher, Jr.                                 WILLIAM E. SCHUYLER, JR.

Attesting Officer                                                Commissioner of Patents